United States Patent [19]

Richards et al.

[11] Patent Number: 5,386,245
[45] Date of Patent: Jan. 31, 1995

[54] APPARATUS AND METHOD FOR PROCESSING A DIGITAL VIDEO SIGNAL WHICH PREVENTS DISCONTINUITIES AND EROSION OF THE PICTURE AREA

[75] Inventors: John W. Richards, Stockbridge; Jonathan M. Soloff, Basingstoke, both of United Kingdom

[73] Assignee: Sony United Kingdom Ltd.

[21] Appl. No.: 934,319

[22] Filed: Aug. 25, 1992

[30] Foreign Application Priority Data

Sep. 6, 1991 [GB] United Kingdom ............. 9119091

[51] Int. Cl.$^6$ ............................................. H04N 5/46
[52] U.S. Cl. ............................ 348/629; 348/445; 348/173
[58] Field of Search ............... 348/173, 629, 628, 445, 348/458, 625; H04N 5/46, 3/20

[56] References Cited

U.S. PATENT DOCUMENTS

| | | | |
|---|---|---|---|
| 4,760,605 | 7/1988 | David et al. ...................... | 348/625 |
| 4,908,874 | 3/1990 | Gabriel ............................. | 348/629 |
| 5,208,669 | 5/1993 | Richards .......................... | 348/445 |
| 5,218,649 | 6/1993 | Kundu et al. ..................... | 348/625 |
| 5,223,936 | 6/1993 | Van Der Voort et al. ........ | 348/445 |

FOREIGN PATENT DOCUMENTS 2073536 10/1981 United Kingdom ........ H04N 9/535
2220828  1/1990 United Kingdom ......... G06F 15/02

Primary Examiner—James J. Groody
Assistant Examiner—Jeffrey S. Murrell
Attorney, Agent, or Firm—William S. Frommer; Alvin Sinderbrand

[57] ABSTRACT

In order to reduce the effects of discontinuities at the edge of a picture and reduce erosion of the usable picture area caused by a filtering or interpolation operation, the edges of the picture are extrapolated prior to such an operation. This may be achieved by a circuit which receives an input line of active pixel data; forms from the input line a delayed line of the active pixel data; produces at least one additional start pixel data derived from a pixel data at or adjacent the start of the input line; produces at least one additional end pixel data derived from a pixel data at or adjacent the end of the input line; and forms an output sequence of pixel data by selecting for the output sequence the additional start pixel data, then at least part of the delayed line, and then the additional end pixel data. This circuit therefore performs zero-order (repeat) extrapolation at the beginning and end of each line. Other circuits are also described for extrapolating lines at or adjacent the start and end of each frame, and for performing a first- or higher-order extrapolation.

36 Claims, 5 Drawing Sheets

APPARATUS AND METHOD FOR PROCESSING A DIGITAL VIDEO SIGNAL WHICH PREVENTS DISCONTINUITIES AND EROSION OF THE PICTURE AREA

BACKGROUND OF THE INVENTION

1. Field of the Invention

This invention relates to digital video signal processing and in particular to an apparatus and to a method for processing a digital video signal.

2. Description of the Prior Art

Video processing operations such as filtering and interpolation use the values of a plurality, for example a patch, of input pixels to form an output pixel value. For example, a simple 4×4 'area filter' generates the value of an output pixel by averaging the values of the input pixels in a 4×4 patch. At the edges of a picture, there is normally a sharp transition from, or into, blanking at black level. This is usually a highly aliased transition, which causes filters, interpolators and the like to 'ring' and produce strange effects at the edge of the picture. Even if the profile of the edge transition is anti-aliased, for example with a transition over say 3 to 5 pixels, so as to try to prevent ringing, there will still be a spread of the edge effects which will erode the usable picture area.

The active acquisition area of a high-definition SMPTE 240M standard digital video frame is 1920 pixels (horizontally) by 1035 pixels (vertically), but in view of the above-mentioned problems some have recommended that the usable production and distribution area of the frame should be cropped so that the production and distribution area is reduced to, say, 1888 pixels by 1017 pixels. (Although embodiments of the invention will be described below in relation to one type of high-definition video signal, it should be noted that the invention is equally applicable to other high-definition and to conventional-definition signals.)

OBJECT AND SUMMARY OF THE INVENTION

An object of the present invention is to reduce the effects of discontinuities at the edge of the picture and reduce erosion of the usable picture area, preferably so that a production and distribution picture area can be used which is the same pixel size as the acquisition picture area.

In accordance with one aspect of the present invention, there is provided an apparatus for processing a digital video signal, comprising: (a) means for receiving an input sequence of units of active pixel data; (b) means for forming from the input sequence a delayed sequence of units of the active pixel data; (c) means for producing at least one additional start pixel data unit derived from at least one unit at or adjacent the start of the input sequence; (d) means for producing at least one additional end pixel data unit derived from at least one unit at or adjacent the end of the input sequence; and (e) control means for forming an output sequence of pixel data units by selecting for the output sequence the additional start pixel data unit(s), then at least part of the delayed sequence, and then the additional end pixel data unit(s). Thus, as a simple example, the apparatus can be considered as extending the picture into the blanking area. Consequently, the extended picture can be processed, for example filtered or interpolated, with any undesirable edge effects remaining predominantly in the extended region, and after all such processing the extended region can be ignored, leaving a picture of the original pixel size.

Each unit of pixel data may be a single pixel, with each sequence of units being a line of pixels, thus extending the picture area at the ends of the lines. In this case, the delayed sequence forming means may simply and conveniently comprise a shift register. With one form of extrapolation into the extended region, at least one of the additional pixel producing means may comprise a latch controlled by the control means, so that the value of such an additional pixel is a repeated pixel value, the same as the value of a pixel at or adjacent the start/end of the line. Alternatively, improved results may be obtained if at least one of the additional pixel producing means comprises means for determining the horizontal pixel value gradient at or adjacent the start/end (as the case may be) of the input line, and means for extrapolating from the value of a selected pixel at or adjacent the line start/end to the value of the or each respective additional pixel in accordance with the determined gradient and the pixel spacing of the additional pixel from the selected pixel. Even better results may be obtained, but requiring more sophisticated circuitry, if at least one of the additional pixel producing means comprises means for determining the coefficients of an nth order polynomial representing the values of selected pixels at and adjacent, or adjacent, the start/end (as the case may be) of the input line, and means for extrapolating the value of the or each additional pixel in accordance with the determined coefficients and the pixel spacing of the additional pixel from the selected pixels.

Alternatively, each unit of pixel data may be a single line of pixels, with each sequence of units being a frame of lines, thus extending the picture area above and below the first and last lines, respectively. In this case, the delayed sequence forming means may simply and conveniently comprise a line delay. With one form of extrapolation into the extended region, at least one of the additional line producing means comprises a line delay and a multiplexer controlled by the control means and connected such that the input to the line delay is selected from the input/delayed line (as the case may be) and the output line from the line delay, so that such an additional line is a repeated line. Alternatively, improved results may be obtained if at least one of the additional line producing means comprises means for determining for each pixel in the first/last line (as the case may be) of the input frame, or a line adjacent thereto, the vertical pixel value gradient at, or adjacent, the start/end of the input frame, and means for extrapolating from the value of that pixel to the value of the respective pixel in the or each additional line in accordance with the determined gradient and the pixel spacing of the additional pixel from that pixel. In this case, the gradient determining means may simply and conveniently comprise at least one line delay and subtractor for determining the difference between the values of corresponding pixels in a pair of lines at or adjacent the start/end (as the case may be) of the input frame, and at least one recirculating line store for storing those difference values. In this case, the extrapolating means may simply and conveniently include a recirculating line store for storing the values of the pixels in one of said lines at or adjacent the start/end (as the case may be) of the input frame, and an adder and multiplier for adding to the stored pixel values a multiple of the respective said difference depending on the spacing of the additional line from said one line. Even better results may be obtained, but requiring more sophisticated circuitry, if at least one of the additional line producing means comprises means for determining for each pixel in one line which is the first/last line (as the case may be), or a line adjacent thereto, the coefficients of an nth order polynomial representing the pixel values at or adjacent the start/end (as the case may be) of the input frame, and means for extrapolating the value of the or each additional pixel in accordance with the determined coefficients and the pixel spacing of the additional pixel from said one line.

A side edge extending apparatus and a top and bottom edge extending apparatus as described above may be cascaded to produce an extended region all around the frame. In this case, preferably the top and bottom edge extender comes before the side edge extender because shorter line delays will be required than if the side edge extender comes first.

Especially in the case where a start or end transition of the input sequence is anti-aliased, it is desirable not to use the pixel data units of the anti-aliased transition for extrapolation. Accordingly, the additional end pixel data unit producing means may be arranged to ignore at least the first and/or at least the last unit of the input sequence. Whether or not there is an anti-aliased transition in the input sequence, the apparatus may further comprise means for processing the output sequence to provide an anti-aliased transition in the pixel data units at the start and/or the end of the output sequence.

In accordance with a second aspect of the present invention, there is provided a method of processing a digital video signal in which an input frame has a predetermined number of active pixels, comprising the steps of: (a) forming from the input frame a first intermediate frame having a larger number of active pixels than the input frame by extrapolating the values of pixels of the input frame at or adjacent at least one edge of the input frame; (b) processing the first intermediate frame to form a second intermediate frame in which the value of each pixel is derived from the values of the pixels in a respective patch of pixels in the first intermediate frame; and (c) outputting the second intermediate frame or a portion thereof as an output frame having the same number of active pixels as the input frame. Thus, the extended first intermediate frame is formed, and processing of the first intermediate frame to form the second intermediate frame may introduce undesirable edge effects, but the affected edges can be cropped in forming the output frame.

The values of pixels at or adjacent both the left and right edges and/or both the top and bottom edges of the input frame may be extrapolated in forming the first intermediate frame.

The extrapolation at or adjacent at least one edge of the input frame may simply be a zero-order extrapolation, such that the value of each extrapolated pixel is equal to the value of a respective pixel at or adjacent the respective edge of the input frame. More complexly, but producing better results, the extrapolation at or adjacent at least one edge of the input frame may be a first-order extrapolation, such that the value of each extrapolated pixel is derived from the values of at least two respective pixels in the input frame and is a linear function of the pixel spacing of that pixel from the respective two pixels. More sophisticatedly, the extrapolation at or adjacent at least one edge of the input frame may be an nth-order extrapolation, such that the value of each extrapolated pixel is derived from the values of at least n respective pixels in the input frame and is an nth order function of the pixel spacing of that pixel from the respective n pixels.

Other objects, features and advantages of the present invention will become apparent upon consideration of the following detailed description of a preferred embodiment thereof, especially when considered with the accompanying drawings in which like reference numerals are employed to designate the same or similar components in the different figures.

DETAILED DESCRIPTION OF THE PREFERRED EMBODIMENT

Figure 1A:
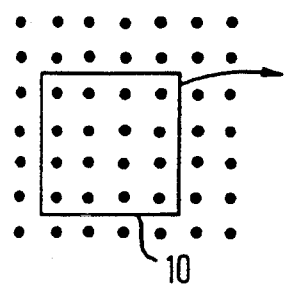
FIGS. 1A and 1B illustrate how a patch of input pixels (FIG. 1A) relates to a filtered output pixel (FIG. 1B)
Figure 1B:
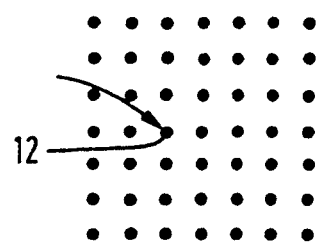
Figure 2A:
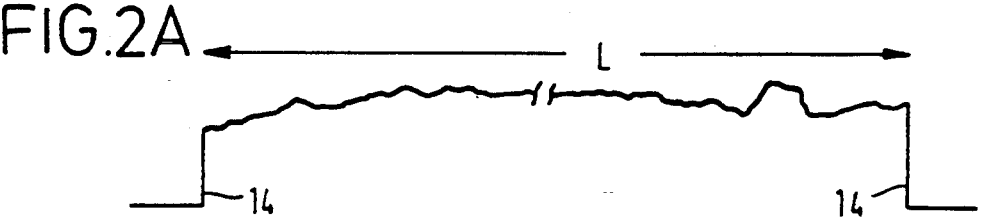
FIGS. 2A and 2B illustrate how an input line (FIG. 2A) with sharp, highly-aliased edge transitions can result in an output line (FIG. 2B) with progressive edge transitions and ringing.
Figure 2B:
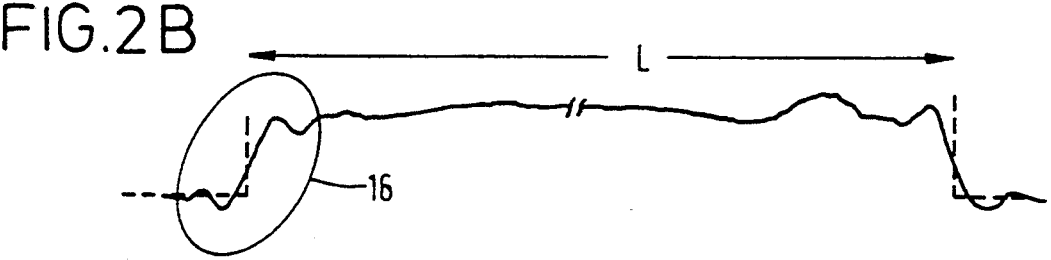
Figure 3A:
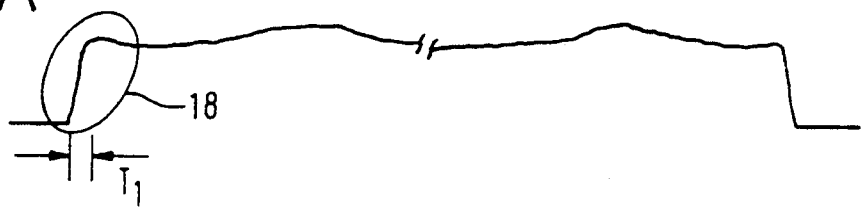
FIGS. 3A and 3B illustrate how an input line (FIG. 3A) with anti-aliased edge transitions can result in an output line (FIG. 3B) with more greatly spread edge transitions which erode the usable active picture area.
Figure 3B:
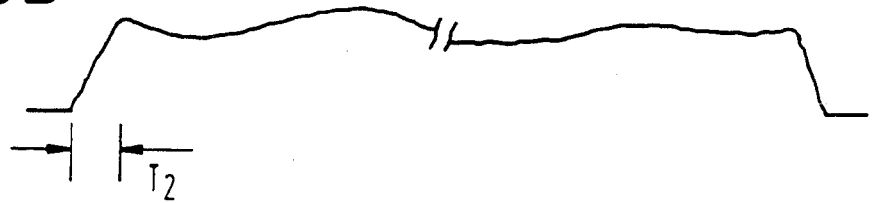

Referring to FIG. 1, a video processing operation such as filtering or interpolation uses the values of a patch 10 of input pixels to form the value of an output pixel 12. At the edges of a picture, there is normally a sharp transition from, or into, blanking at black level. This is usually a highly aliased transition as indicated 14 in FIG. 2A, which causes filters, interpolators and the like to 'ring' and produce strange effects at the edge of the picture, as indicated 16 in FIG. 2B. Some of these effects are lost, because they are outside the active line width L, or active frame height, but some of these effects within the active line width L, or frame height, are included in the output picture. Even if the profile of the edge transition is anti-aliased, as indicated 18 in FIG. 3A with an edge transition period $T_1$, so as to try to prevent ringing, there will be a spread of the edge effects to a greater edge transition period $T_2$, as shown in FIG. 3B, which will erode the usable picture area.

Figure 4:
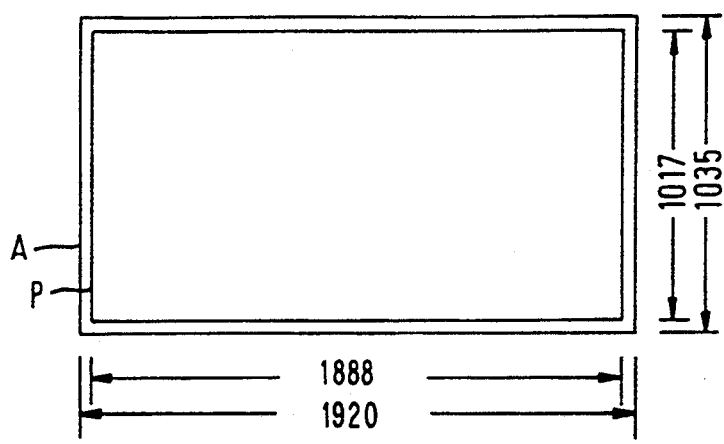
FIG. 4 illustrates the difference between an acquired picture area and the usable production and distribution area which has previously been proposed.

The active acquisition area of an SMPTE 240M standard digital video frame is 1920 pixels (horizontally) by 1035 pixels (vertically), as indicated A in FIG. 4, but in view of the above-mentioned problems some have recommended that the usable production and distribution area of the frame should be cropped by a border sixteen pixels wide at the left and right and nine pixels high at top and bottom so that the production and distribution area is reduced to 1888 pixels by 1017 pixels, as indicated P in FIG. 4.

Figure 5A:
FIGS. 5A to 5D illustrate how an input line (FIG. 5A) with sharp, highly-aliased edge transitions can be processed using edge pixel repeat extrapolation (FIG. 5B) in a first embodiment of the invention, using first order extrapolation (FIG. 5C) in a second embodiment of the invention, and using higher order extrapolation (FIG. 5D) in a third embodiment of the invention.
Figure 5B:
Figure 5C:
Figure 5D:

The three embodiments of the present invention described in detail below use 'upstream' signal conditioning which effectively extends the picture area into the blanking area. In the first embodiment, this is accomplished by extending the data value of each pixel at the edge of the frame into the blanking area, as illustrated in FIG. 5B. In the second embodiment, it is accomplished by a first order extrapolation, that is to say the gradients of the pixel data values at and adjacent the edge of the frame are determined and used in linear extrapolation into the blanking area, as illustrated in FIG. 5C. The third embodiment is similar to the second embodiment, except that higher order extrapolation, such as quadratic or cubic, is used, as illustrated in FIG. 5D.

Figure 6:
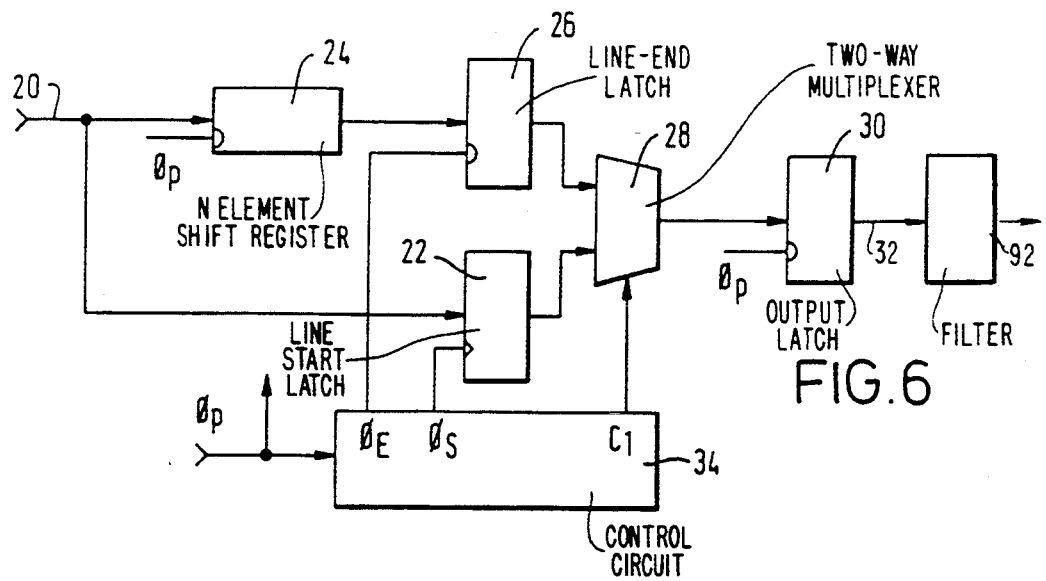
FIG. 6 is a block diagram of an apparatus of the first embodiment for horizontal extrapolation.

Considering the first embodiment, FIG. 6 shows an apparatus for extrapolating the frame widthwise. The digital video signal is input at 20 to a line-start latch 22 and an N (say sixteen) element shift register 24, the output of which is input to a line-end latch 26. The outputs of the two latches 22, 26 are input to respective inputs of a two-way multiplexer 28, the output of which passes through an output latch 30 to the output at 32. A pixel clock signal $\phi_P$ is used to clock the shift register 24, output latch 30 and a control circuit 34. The control circuit produces a line-start clock signal $\phi_S$ and a line-end clock signal $\phi_E$ which clock the respective latches 22, 26, and also a control signal $C_1$ for the multiplexer 28, all timed so as to cause the apparatus to operate as follows.

In a line of pixel data $P_1$ to $P_{1920}$, the first pixel data $P_1$ is latched in the line-start latch 22 while the first N (16) pixel data $P_1$ to $P_N$ fill the shift register 24. During this time, the multiplexer 28 selects the line-start latch 22 so that the first pixel data $P_1$ is output at 32 N (16) times. The multiplexer 28 then selects the line-end latch 26, which passes the pixel data $P_1$ to $P_{1920}$ which are being clocked through the shift register 24, so that the pixel data $P_1$ to $P_{1920}$ are output at 32. The line-end latches the last pixel data $P_{1920}$, which is then output a further N (16) times at 32. Thus, pixel data $P_1$, $P_2$, ..., $P_{1920}$ are input to the apparatus at 20, and pixel data $P_1$ N+1 (17) times, $P_2$, $P_3$, ..., $P_{1919}$, and $P_{1920}$ N+1 (17) times are output at 32.

Figure 7:
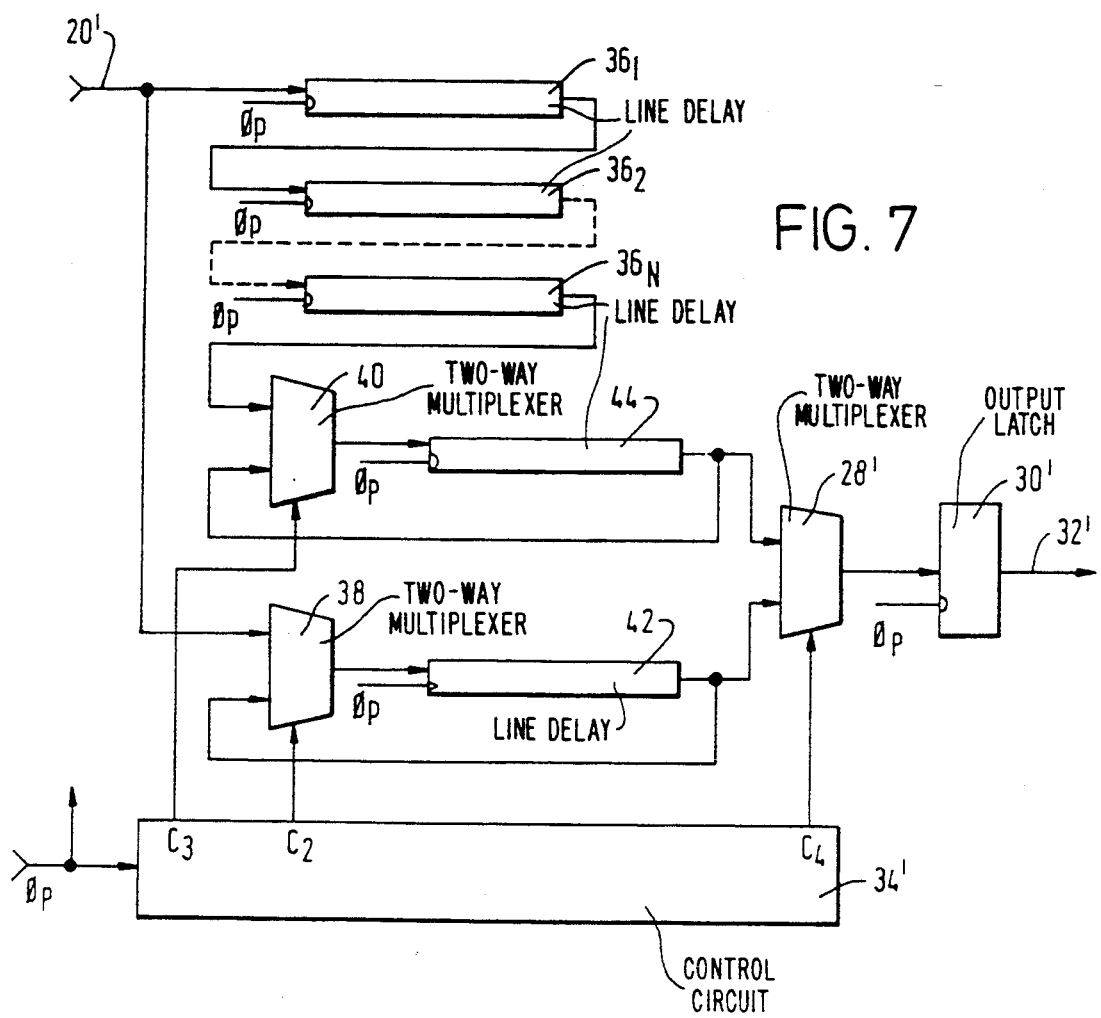
FIG. 7 is a block diagram of an apparatus of the first embodiment for vertical extrapolation.

FIG. 7 shows the apparatus of the first embodiment for extrapolating the frame heightwise. The FIG. 7 apparatus is somewhat similar to that of FIG. 6, and the reference numerals for elements which perform a similar function are indicated with a prime ('). The main differences are that the shift register 24 of FIG. 6 is replaced by a cascade of N (say 9) line delays $36_1$ to $36_N$, and the line-start and line-end latches 22, 26 are each replaced by a two-way multiplexer 38, 40 outputting to a line delay 42, 44, with the output of the line delay 42, 44 feeding back to an input of the multiplexer 38, 40. The line delays $36_1$ to $36_N$, output latch 30', and control circuit 34' are clocked by the pixel clock signal $\phi_P$, and the control circuit supplies control signals $C_2$, $C_3$, $C_4$ to the multiplexers 38, 40, 28', respectively, all timed so as to cause the apparatus to operate as follows.

In a frame of lines $L_1$ to $L_{1035}$, each of pixel data $P_1$ to $P_{1920}$, the first line $L_1$ is clocked into the line delay 42 via the multiplexer 38 and is then recirculated via the multiplexer 38 while the first N (9) lines $L_1$ to $L_N$ fill the cascade of line delays $36_1$ to $36_N$ and then the first line $L_1$ fills the line delay 44 via the multiplexer 40. During this time, the multiplexer 28' selects the line delay 42 so that the first line $L_1$ is output at 32' N (9) times. The multiplexer 28' then selects the line delay 44, which passes the lines $L_1$ to $L_{1035}$ which are being clocked through the cascade of line delays $36_1$ to $36_N$, so that the lines $L_1$ to $L_{1035}$ are output at 32'. After the last line $L_{1035}$ has been fed into the line delay 44, the multiplexer 40 recirculates the line, which is then output a further N (9) times at 32'. Thus, lines $L_1$, $L_2$, ..., $L_{1035}$ are input to the apparatus at 20', and lines $L_1$ N+1 (10) times, $L_2$, $L_3$, ..., $L_{1034}$, and $L_{1035}$ N+1 (10) times are output at 32'.

The apparatuses of FIGS. 6 and 7 may be cascaded in order both to extend the lines lengthwise and to extend the frame heightwise. If the FIG. 7 apparatus follows the FIG. 6 apparatus, then the line delays need to be able to accommodate the extended lines of 1920+2N (1952) pixels. Therefore it is preferable that the FIG. 7 apparatus precedes the FIG. 6 apparatus so that the line delays need a capacity of only 1920 pixels.

Figure 8:
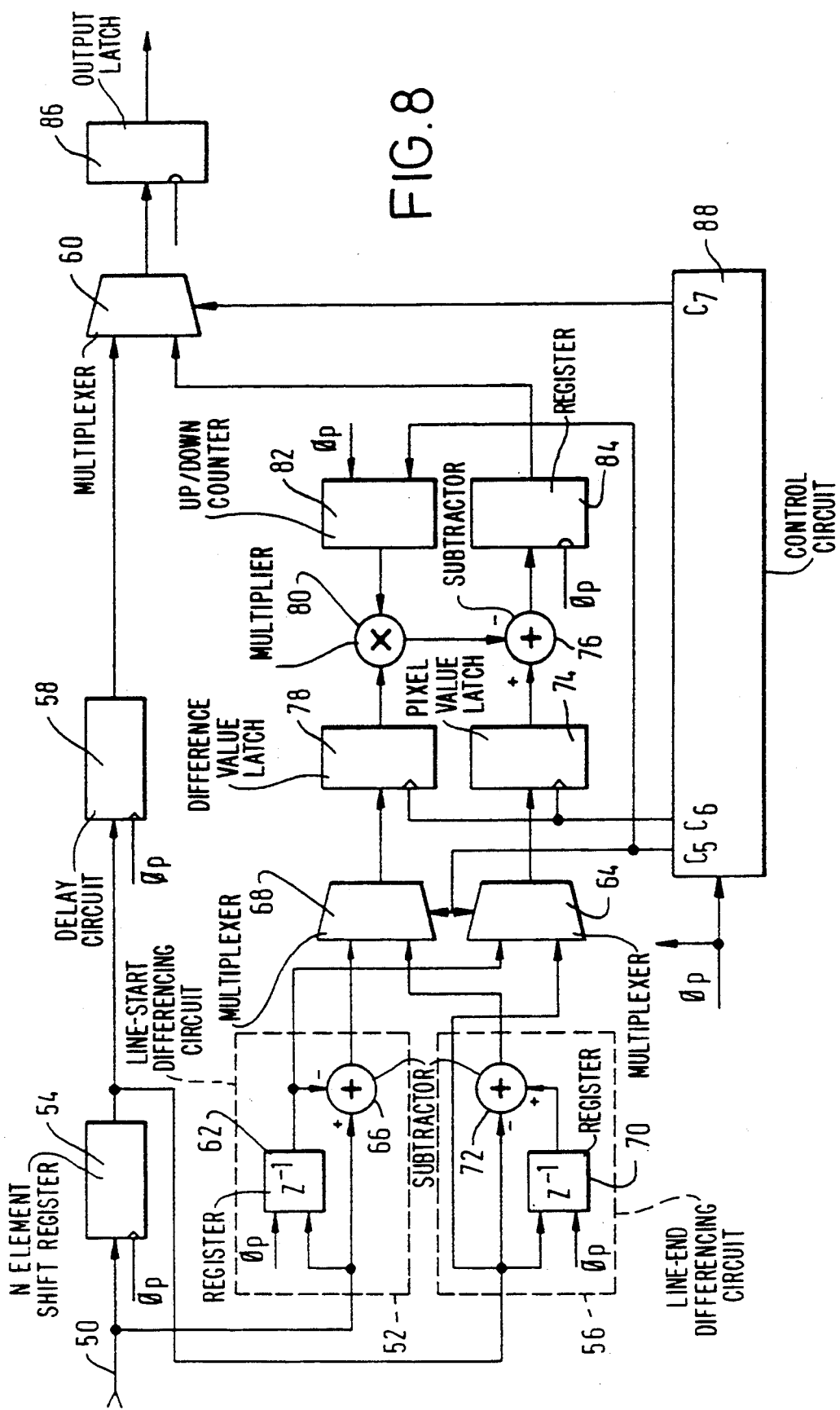
FIG. 8 is a block diagram of an apparatus of the second embodiment for horizontal extrapolation.

Turning now to the second embodiment, FIG. 8 shows an apparatus for extrapolating the frame widthwise. The digital video signal is input at 50 to a line-start differencing circuit 52 and an N (say sixteen) element shift register 54, the output of which is fed to a line-end differencing circuit 56 and via a compensating delay circuit 58 to a two-way output multiplexer 60. The line-start differencing circuit 52 includes a register 62 which outputs to a two-way pixel value multiplexer 64 and a subtractor 66 which receives the input pixel to the circuit 52 at its positive input and the preceding pixel (delayed by the register 62) at its negative input, the output of the subtractor 66 being fed to a two-way difference value multiplexer 68. Conversely, the line-end differencing circuit 56 includes a register 70 which outputs to the positive input of a subtractor 72. The input to the circuit 56 is also fed to the negative input of the subtractor 72 and to the other input of the pixel value multiplexer 64. The output of the subtractor is fed to the other input of the difference value multiplexer 68. The pixel value multiplexer outputs via a pixel value latch 74 to the positive input of a subtractor 76, whereas the difference value multiplexer 68 outputs via a difference value latch 78 to one input of a multiplexer 80. The other input of the multiplier is supplied by an up/down counter 82, and the output of the multiplier 80 is supplied as the negative input of the subtractor 76. The output of the subtractor 76 is supplied via a register 84 to the other input of the output multiplexer 60, which supplies the output of the apparatus via an output register 86. The shift register 54, compensating delay circuit 58, registers 62, 70, 84, 86, up/down counter 82, and a control circuit are clocked by a pixel clock signal $\phi_P$, and the control circuit 88 supplies control signals: $C_5$ to the pixel value and difference value multiplexers 64, 68 and the up/down counter 82; $C_6$ to the pixel value and difference value latches 74, 78; and $C_7$ to the output multiplexer 60, all timed to cause the apparatus to operate as follows.

In a line of pixel data $P_1$ to $P_{1920}$, the first pixel data $P_1$ is registered in the register 62 and is applied to the negative input of the subtractor 66. The second pixel data $P_2$ is applied to the positive input of the subtractor 66, and the line start gradient $\Delta_S$ equal to the $P_2-P_1$ is fed via the difference value multiplexer 68 to be latched in the difference value latch 78, while at the same time the first pixel data is fed via the pixel value multiplexer 64 to be latched in the pixel value latch 74. The up-/down counter is initially loaded with the value N (16), and therefore the multiplier 80 produces a value $N\Delta_S$. The subtractor 76 therefore produces a value $P_1-N\Delta_S$, which is output via the register 84, output multiplexer 60 and output register 86. With the next pixel clock cycle, the output of the counter 82 has been decremented to $N-1$, and therefore the value of the output pixel is $P_1-(N-1)\Delta_S$. This process continues until the Nth pixel is output with a value $P_1-\Delta_S$, by which time the input pixels have worked their way through the shift register 54 and the compensating delay circuit 58. The output multiplexer 60 then selects the output of the compensating delay circuit 58, so that the pixel data $P_1$, $P_2, \ldots, P_{1920}$ are output. Prior to the end of this, and at the stage when the end pixel data $P_{1920}$ is output from the shift register 54, it is applied to the negative input of the subtractor 72, whilst the penultimate pixel data $P_{1919}$ registered in the register 70 is applied to the positive input of the subtractor 72. The line end gradient $\Delta_e$ equal to $P_{1919}-P_{1920}$ is output from the subtractor 72 and fed via the difference value multiplexer 68 to be latched in the difference value latch 78, while the end pixel data $P_{1920}$ is fed via the pixel value multiplexer 64 to be latched in the pixel value latch 74. The up/down counter is loaded with the value 1, and therefore the multiplier 80 produces a value $\Delta_e$. The subtractor 76 therefore produces a value $P_{1920}-\Delta_e$, which is output via the register 84, output multiplexer 60 and output register 86 immediately after the pixel data $P_{1920}$ from the compensating delay circuit has been output. At the line end, the counter is incremented, rather than decremented, and therefore with the next pixel clock cycle, the output of the counter 82 has been incremented to 2, and therefore the value of the output pixel is $P_{1920}-2\Delta_e$. This process continues until the Nth pixel is output with a value $P_{1920}-N\Delta_e$. Thus, pixel data $P_1, P_2, \ldots, P_{1920}$ are input to the apparatus at 50, and pixel data $P_1-N\Delta_S, P_1-(N-1)\Delta_S, \ldots, P_1-\Delta_S, P_1, P_2, P_3, \ldots, P_{1919}, P_{1920}, P_{1920}-\Delta_e, P_{1920}-2\Delta_e, \ldots,$ and $P_{1920}-N\Delta_e$ are output at 32.

Figure 9:
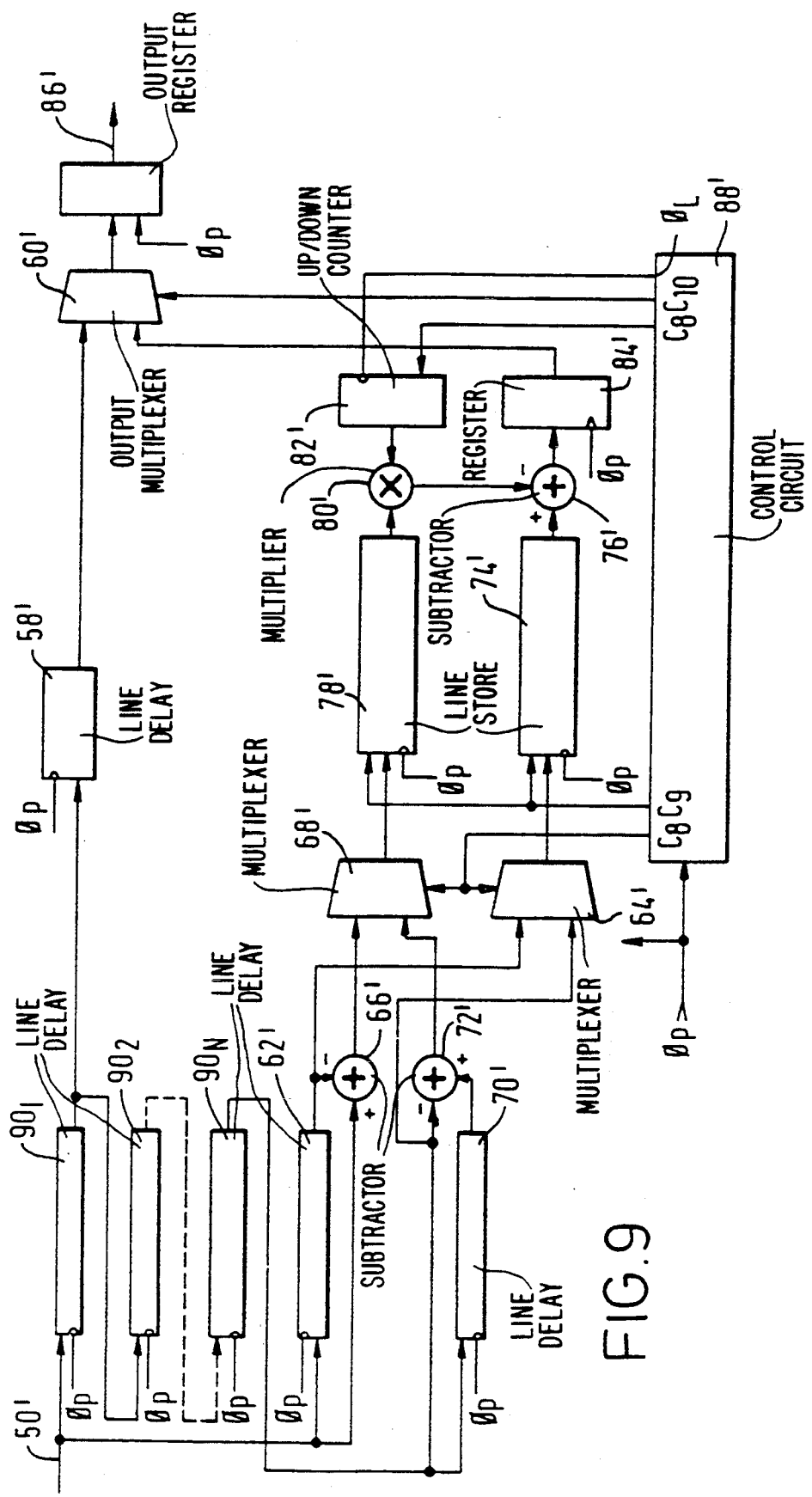
FIG. 9 is a block diagram of an apparatus of the second embodiment for vertical extrapolation.

FIG. 9 shows the apparatus of the second embodiment for extrapolating the frame heightwise. The FIG. 9 apparatus is somewhat similar to that of FIG. 8, and the reference numerals for elements which perform a similar function are indicated with a prime ('). The main differences are that: the shift register 54 of FIG. 8 is replaced by a cascade of N (say 9) line delays $90_1$ to $90_N$; the registers 62, 70 of FIG. 8 are replaced by respective line delays 62', 70'; and the pixel value and difference value latches 74, 78 are each replaced by respective recirculating line stores 74', 78'. The line delays $90_1$ to $90_N$, 62', 70', recirculating line stores 74', 78', registers 84', 86', compensating delay circuit 58' and control circuit 88' are clocked by the pixel clock signal $\phi_p$, and the control circuit 88' supplies control signals: $C_8$ to the pixel value and difference value multiplexers 64', 68' and up/down counter 82'; $C_9$ to the recirculating line stores 74', 78'; and $C_{10}$ to the output multiplexer 60'. The control circuit also supplies a line clock signal $\phi_L$ to the up/down counter 82' so that the counter increments or decrements with lines, rather than pixels as in the FIG. 8 apparatus.

The difference in operation between the FIG. 9 and FIG. 8 apparatuses is analogous to the difference in operation between the FIG. 7 and FIG. 6 apparatuses.

In a frame of lines, each of 1920 pixels, the first line is clocked into the line delays 62' and $90_1$ and each pixel is applied to the negative input of the subtractor 66'. The corresponding pixels of the second line are applied to the positive input of the subtractor 66', and the frame start gradients for the 1920 pairs of pixels are fed via the difference value multiplexer 68' to be recirculated in the difference value recirculating line store 78', while at the same time the pixel data of the first line is fed via the pixel value multiplexer 64' to be latched in the pixel value recirculating line store 74'. The up/down counter is initially loaded with the value N (9), and therefore the multiplier 80' produces a line of values for the 1920 pixels in the line, each equal to N times the respective gradient. The subtractor 76' therefore produces a line of values, each differing from the value of the respective pixel in the first line by N times the respective gradient, which are output via the register 84', output multiplexer 60' and output register 86'. With the next pixel clock cycle, the output of the counter 82 has been decremented to $N-1$, and therefore the value of the output pixel is $(N-1)$ times the respective gradients is used. This process continues until the Nth line is output, by which time the input lines have worked their way through the line delays $90_1$ to $90_N$ and the compensating delay circuit 58'. The output multiplexer 60' then selects the output of the compensating delay circuit 58', so that 1035 lines are output. Prior to the end of this, and at the stage when the end line of pixel data in the input frame is output from the last line delay $90_N$, the pixel data of that line are applied to the negative input of the subtractor 72', whilst pixel data of the penultimate line are output from the line delay 70' and applied to the positive input of the subtractor 72'. The frame end gradients are output from the subtractor 72' and fed via the difference value multiplexer 68' to be recirculated in the difference value recirculating line store 78', while the pixel data of the last line are fed via the pixel value multiplexer 64' to be recirculated in the pixel value recirculating line store 74'. The up/down counter is loaded with the value 1, and therefore the multiplier 80' produces a line of gradients. The subtractor 76' therefore produces a line of values, differing from the values of the respective pixels in the last line by the respective gradients, which are output via the register 84', output multiplexer 60' and output register 86', immediately after the last line of pixel data from the compensating delay circuit has been output. At the line end, the counter is incremented, rather than decremented, and therefore with the next line clock cycle, the output of the counter 82 has been incremented to 2, and therefore the value of the output pixels differ from the values of the respective pixels in the last line by twice the respective gradients. This process continues until the Nth line is output with values differing from the respective end line values by N times the respective gradients. Thus, the top and bottom of the frame are linearly extrapolated.

As in the case of the FIGS. 6 and 7 apparatuses, the apparatuses of FIGS. 8 and 9 may be cascaded in order both to extend the lines lengthwise and to extend the frame heightwise, and it is preferable that the FIG. 9 apparatus precedes the FIG. 8 apparatus, again so that the line delays need a capacity of only 1920 pixels. Also, the apparatuses of the two embodiments may be mixed, for example by using the zero-order frame height extrapolator of FIG. 7 followed by the first-order frame width extrapolator of FIG. 8.

In a third embodiment of the invention, a 2- or higher-order extrapolation is performed to extend the frame width and/or frame height. For example, considering extrapolation at the beginning of a line, the values of the first three pixels are applied to an arrangement of arithmetic circuits or a table to determine the coefficients of a quadratic representing those values, and those coefficients are then used by a further arrangement of circuits to extrapolate the values of the additional pixels.

In the embodiments described above, extrapolation is carried out from the pixels at the edge of the frame. In the case where the input frame has an anti-aliased edge transition border, the control signals supplied by the control circuits 34, 34', 88, 88' may be varied so that the input pixels in the transition border are ignored, and so that extrapolation is carried out from pixels inset for example by 3 or 5 pixel spacings from the edge of the input frame so as to expand the frame to its original size or to a greater size.

After the frames output from the output latch 30, 30' or the output register 86, 86' of the apparatus described above have been further processed (for example by filtering in a filter 92 (shown in FIG. 6) or by interpolation), the additional pixels formed by the above apparatuses may be ignored to produce a final frame of the original size. Additionally, an anti-aliasing process may be applied to the pixels at and adjacent the edge of the final frame in a known manner, for example using a cosine-squared or ramp profile.

Having described a preferred embodiment of the invention with reference to the accompanying drawings, it is to be understood that the invention is not limited to the precise embodiment and that various changes and modification thereof may be effected by one skilled in the art without departing from the spirit or scope of the invention as defined in the appended claims.

What is claimed is:

1. An apparatus for processing a digital video signal, comprising:
   (a) means for receiving an input sequence of units of active pixel data;
   (b) means for forming from said input sequence a delayed sequence of units of the active pixel data;
   (c) means for producing at least one additional start pixel data unit derived from at least one unit at or adjacent the start of said input sequence;
   (d) means for producing at least one additional end pixel data unit derived from at least one unit at or adjacent the end of said input sequence; and
   (e) control means for forming an output sequence of pixel data units by supplying said at least one additional start pixel data unit, followed by at least part of said delayed sequence, and then by said at least one additional end pixel data unit.

2. An apparatus as claimed in claim 1, wherein each said unit of pixel data is a single pixel, and each said sequence of units is a line of pixels.

3. An apparatus as claimed in claim 2, wherein said delayed sequence forming means comprises at least one shift register.

4. An apparatus as claimed in claim 2, wherein at least one of said additional pixel producing means comprises a latch controlled by said control means, so that the value of such an additional pixel is a repeated pixel value.

5. An apparatus as claimed in claim 2, wherein said additional start pixel producing means comprises means for determining a horizontal pixel value gradient at or adjacent the start of the input sequence, and means for extrapolating from the value of a selected pixel at or adjacent the line start to the value of the or each respective additional pixel in accordance with said determined gradient and the pixel spacing of the additional pixel from the selected pixel.

6. An apparatus as claimed in claim 2, wherein said additional end pixel producing means comprises means for determining a horizontal pixel value gradient at or adjacent the end of the input sequence, and means for extrapolating from the value of a selected pixel at or adjacent the line end to the value of the or each respective additional pixel in accordance with said determined gradient and the pixel spacing of the additional pixel from the selected pixel.

7. An apparatus as claimed in claim 2, wherein said additional start pixel producing means comprises means for determining the coefficients of an nth order polynomial representing the values of selected pixels at and adjacent, or adjacent, the start of the input line, and means for extrapolating the value of the or each additional pixel in accordance with said determined coefficients and the pixel spacing of the additional pixel from the selected pixels.

8. An apparatus as claimed in claim 2, wherein said additional end pixel producing means comprises means for determining the coefficients of an nth order polynomial representing the values of selected pixels at and adjacent, or adjacent, the end of the input line, and means for extrapolating the value of the or each additional pixel in accordance with said determined coefficients and the pixel spacing of the additional pixel from the selected pixels.

9. An apparatus as claimed in claim 1, further comprising means for filtering the pixel values of said output sequence such that the value of each filtered pixel is derived from the values of a patch of pixels in said output sequence.

10. An apparatus as claimed in claim 1, wherein said additional start pixel data unit producing means ignores at least the first unit of said input sequence.

11. An apparatus as claimed in claim 1, wherein said additional end pixel data unit producing means ignores at least the last unit of said input sequence.

12. An apparatus as claimed in claim 1, further comprising means for processing said output sequence to provide an anti-aliased transition in the pixel data units at the start of the output sequence.

13. An apparatus as claimed in claim 1, further comprising means for processing said output sequence to provide an anti-aliased transition in the pixel data units at the end of the output sequence.

14. An apparatus as claimed in claim 1, wherein each said unit of pixel data is a single line of pixels, and each said sequence of units is a frame of lines.

15. An apparatus as claimed in claim 14, wherein said delayed sequence forming means comprises at least one line delay.

16. An apparatus as claimed in claim 14, wherein said additional start pixel producing means comprises a line delay and a multiplexer controlled by said control means and connected such that the input to the line delay is selected from an input line and an output line from the line delay, so that such an additional line is a repeated line.

17. An apparatus as claimed in claim 14, wherein said additional end pixel producing means comprises a line delay and a (multiplexer) controlled by said control means and connected such that the input to the line delay is selected from a delayed line and an output line from the line delay, so that such an additional line is a repeated line.

18. An apparatus as claimed in claim 14, wherein said additional start pixel producing means comprises means for determining for each pixel in the first of the input frame, or a line adjacent thereto, a vertical pixel value gradient at, or adjacent, the start of the input frame, and means for extrapolating from the value of that pixel to the value of the respective pixel in the or each additional line in accordance with said determined gradient and the pixel spacing of the additional pixel from that pixel.

19. An apparatus as claimed in claim 18, wherein said gradient determining means comprises at least one line delay and subtractor for determining a difference between the values of corresponding pixels in a pair of lines at or adjacent the start of the input frame, and at least one recirculating line store for storing those difference values.

20. An apparatus as claimed in claim 19, wherein said extrapolating means includes a recirculating line store for storing the values of the pixels in one of said lines at or adjacent the start of the input frame, and an adder and multiplier for adding to the stored pixel values a multiple of the respective said difference depending on the spacing of the additional line from said one line.

21. An apparatus as claimed in claim 14, wherein said additional end pixel producing means comprises means for determining each pixel in the last of the input frame, or a line adjacent thereto, a vertical pixel value gradient at, or adjacent, the end of the input frame, and means for extrapolating from the value of that pixel to the value of the respective pixel in the or each additional line in accordance with said determined gradient and the pixel spacing of the additional pixel from that pixel.

22. An apparatus as claimed in claim 21, wherein said gradient determining means comprises at least one line delay and subtractor for determining a difference between the values of corresponding pixels in a pair of lines at or adjacent the end of the input frame, and at least one recirculating line store for storing those difference values.

23. An apparatus as claimed in claim 22, wherein said extrapolating means includes a recirculating line store for storing the values of the pixels in one of said lines at or adjacent the end of the input frame, and an adder and multiplier for adding to the stored pixel values a multiple of the respective said difference depending on the spacing of the additional line from said one line.

24. An apparatus as claimed in claim 14, wherein said additional start pixel producing means comprises means for determining for each pixel in one line which is the first line, or a line adjacent thereto, coefficients of an nth order polynomial representing the pixel values at or adjacent the start of the input frame, and means for extrapolating the value of the or each additional pixel in accordance with said determined coefficients and the pixel spacing of the additional pixel from said one line.

25. An apparatus as claimed in claim 14, wherein said additional end pixel producing means comprises means for determining for each pixel in one line which is the last line, or a line adjacent thereto, coefficients of an nth order polynomial representing the pixel values at or adjacent the end of the input frame, and means for extrapolating the value of the or each additional pixel in accordance with said determined coefficients and the pixel spacing of the additional pixel from said one line.

26. A method of processing a digital video signal in which an input frame has a predetermined number of active pixels, comprising the steps of:
   (a) forming from said input frame a first intermediate frame having a larger number of active pixels than said input frame by extrapolating the values of pixels of the input frame at or adjacent at least one edge of the input frame;
   (b) processing said first intermediate frame to form a second intermediate frame in which the value of each pixel is derived from the values of the pixels in a respective patch of pixels in said first intermediate frame; and
   (c) outputting said second intermediate frame or a portion thereof as an output frame having the same number of active pixels as said input frame.

27. A method as claimed in claim 26, wherein values of pixels at or adjacent both left and right edges of said input frame are extrapolated in forming said first intermediate frame.

28. A method as claimed in claim 26, wherein values of pixels at or adjacent both top and bottom edges of said input frame are extrapolated in forming said first intermediate frame.

29. A method as claimed in claim 26, wherein the extrapolation at or adjacent at least one edge of said input frame is a zero-order extrapolation, such that a value of each extrapolated pixel is equal to a value of a respective pixel at or adjacent the respective edge of said input frame.

30. A method as claimed in claim 26, wherein the extrapolation at or adjacent at least one edge of said input frame is a first-order extrapolation, such that a value of each extrapolated pixel is derived from values of at least two respective pixels in said input frame and is a linear function of pixel spacing of that pixel from the respective two pixels.

31. A method as claimed in claim 26, wherein the extrapolation at or adjacent at least one edge of said input frame is an nth-order extrapolation, such that a value of each extrapolated pixel is derived from values of at least n respective pixels in said input frame and is an nth order function of pixel spacing of that pixel from the respective n pixels.

32. A method as claimed in claim 26, wherein said processing step includes a filtering operation.

33. A method as claimed in claim 26, wherein said first intermediate frame has a width which is a plurality of pixels greater than that of the input frame.

34. A method as claimed in claim 26, wherein said first intermediate frame has a height which is a plurality of pixels greater than that of the input frame.

35. A method as claimed in claim 26, wherein, in said forming step, a value of at least the pixel at said one edge is ignored in the extrapolation.

36. A method as claimed in claim 26, further comprising the step of processing said output frame to provide an anti-aliased transition in the pixel data at least at one edge of said output frame.

* * * * *